US006940713B2

(12) United States Patent
Huang et al.

(10) Patent No.: US 6,940,713 B2
(45) Date of Patent: Sep. 6, 2005

(54) PORTABLE COMPUTER STANDING SUPPORT STRUCTURE

(75) Inventors: Chao-Ming Huang, Taipei (TW); Wen-Chieh Wang, Taipei (TW); Kao-Wen Chang, Taipei (TW); Ming-Hsun Yang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 10/799,674

(22) Filed: Mar. 15, 2004

(65) Prior Publication Data

US 2005/0135049 A1 Jun. 23, 2005

(30) Foreign Application Priority Data

Dec. 17, 2003 (TW) .............................. 92222116 U

(51) Int. Cl.7 ................................................ G06F 1/16
(52) U.S. Cl. .................... 361/680; 3248/922; 345/905; 364/708.1
(58) Field of Search ................................ 361/679–687, 361/724–727; 248/917–923; 345/179, 905; 364/708.1

(56) References Cited

U.S. PATENT DOCUMENTS

| | | | | |
|---|---|---|---|---|
| 5,196,993 | A * | 3/1993 | Herron et al. | 361/681 |
| 6,464,195 | B1 * | 10/2002 | Hildebrandt | 248/460 |
| 2005/0052831 | A1 * | 3/2005 | Chen | 361/680 |
| 2005/0073808 | A1 * | 4/2005 | Wang | 361/683 |

* cited by examiner

*Primary Examiner*—Hung Van Duong
(74) *Attorney, Agent, or Firm*—Bacon & Thomas PLLC

(57) ABSTRACT

A portable computer standing support structure is disclosed to include a base member having a front locating device formed on the top face near the front edge and a rear locating device formed on the top face between the front edge and the rear edge, and a portable computer supported on a support arm at the base member and selectively positioned on the front locating device and rear locating device of the base member between an inclined position of low steepness for use with a touching pen and an inclined position of high steepness for use with a keyboard.

4 Claims, 4 Drawing Sheets

PORTABLE COMPUTER STANDING SUPPORT STRUCTURE

BACKGROUND OF THE INVENTION

1. Field of the Invention

The present invention is directed toward a portable computer standing support structure and more particularly, toward a tablet PC standing support structure for enabling a tablet PC to be positioned on a base member in an inclined position.

2. Description of Related Art

A tablet PC or similar portable computer may be used with a base member having a keyboard. The user may use the touching pen of the portable computer to operate the portable computer, or the keyboard of the base member for data input. Therefore, the tablet PC and the base member form a dual-usage portable computer.

FIG. 1 is a perspective side view showing a tablet PC supported on a base member according to the prior art. As shown in FIG. 1, the tablet PC 91 has the bottom edge stopped against a stop flange 922 at the base member 92 and the back side supported on a support arm 923 of the base member 92. The base member 92 has a keyboard 921 on the top face for data input.

However, because the tablet PC 91 is supported on the base member 92 in an inclined position of high steepness, it is inconvenient to operate the tablet PC 91 with a touching pen 93. Frequently using a touching pen 93 to operate the tablet PC 91 may cause injury to the user's wrist and elbow.

SUMMARY OF THE INVENTION

The present invention is designed to overcome the drawback of the prior art discussed above. It is the main object of the present invention to provide a portable computer standing support structure, which provides multiple modes of use and is ergonomic to prevent injury to the user.

To achieve this and other objects of the present invention, the portable computer standing support structure comprises a base member and a portable computer. The base member comprises a top face, a front edge, a rear edge, a left-side edge, a right-side edge, a support arm fastened pivotally on the top face near the rear edge and rotatable upwardly relative to the top face, at least one front locating device formed on the top face near the front edge, and at least one rear locating device formed on the top face between the front edge and the rear edge. The portable computer comprises a bottom edge, a front display face, a back face, and at least one locating device protruded from the back face adjacent to the bottom edge and adapted to selectively engage into the at least one front locating device and at least one rear locating device of the base member. The portable computer can be supported on the support arm of the base member in a first inclined position where the back face of the portable computer is supported on the support arm of the base member and the at least one locating device of the portable computer is respectively set into engagement with the at least one rear locating device of the base member. Alternatively, the portable computer can be supported on the support arm of the base member in a second inclined position where the back face of the portable computer is supported on the support arm of the base member and the at least one locating device of the portable computer is respectively set into engagement with the at least one front locating device of the base member for enabling the portable computer to be operated with a touching pen.

By means of the design of the front and rear locating devices of the base member, the portable computer can be supported on the base member between different inclined positions. When the portable computer is positioned on the at least one rear locating device of the base member, the user can use a keyboard or the like to input data into the portable computer. When the portable computer is positioned on the at least one front locating device of the bas member, the user can use a touching pen to input data into the portable computer. When using a touching pen to operate the portable computer, the portable computer is supported in a smoothly inclined position. This ergonomic design enables the user to operate the portable computer with the hand comfortably without causing injury to the user's hand.

DETAILED DESCRIPTION OF THE PREFERRED EMBODIMENT

Figure 1:
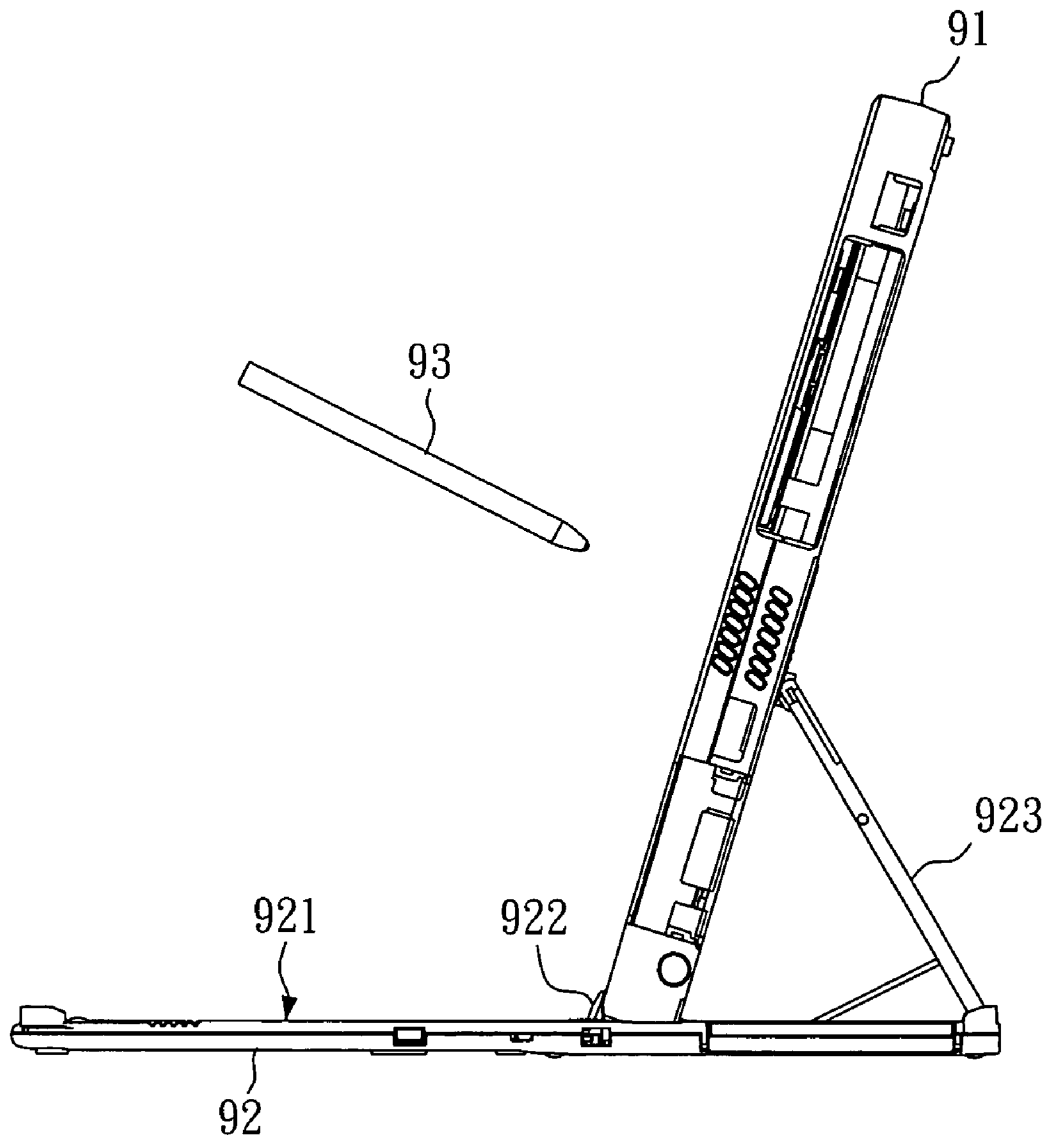
FIG. 1 is a perspective side view showing a tablet PC supported on a base member according to the prior art.

Referring to the drawings in detail wherein like reference numerals have been used throughout the various figures to designate like elements, there is shown in FIG. 1 a portable computer standing support structure constructed in accordance with the principles of the present invention. The portable computer standing support structure essentially includes a base member 1, and a portable computer 2. The base member 1 has a top face 10, a front edge 101, a rear edge 102, a left-side edge 103, and a right-side edge 104. A keyboard 14 is mounted on the top face 10. Two stop flanges 13 are respectively protruded upwardly extended from the top face 10 adjacent to the two distal ends of the front edge 101.

A support arm 11 is fastened pivotally with the top face 10 of the base member 1 near the rear edge 102, and can be rotated upwardly from the top face 10 of the base member 1. Two front locating devices 12 are formed on the top face 10 of the base member 1 near the front edge 101 and respectively disposed adjacent to the left-side edge 103 and the right-side edge 104. Two rear locating devices 15 are formed on the top face 10 of the base member 1 between the front edge 101 and the rear edge 102, and respectively disposed adjacent to the left-side edge 103 and the right-side edge 104. According to the present preferred embodiment, the front locating devices 12 and the rear locating devices 15 are recessed portions.

The portable computer 2 according to the present preferred embodiment is a tablet PC, having a bottom edge 201, a front display face 21, and a back face 22. Two locating devices 23 are protruded from the back face 22 of the portable computer 2 adjacent to the bottom edge 201. According to the present preferred embodiment, the locating devices 23 are raised portions fitting the recessed portions 15 of the base member 1.

Figure 2:
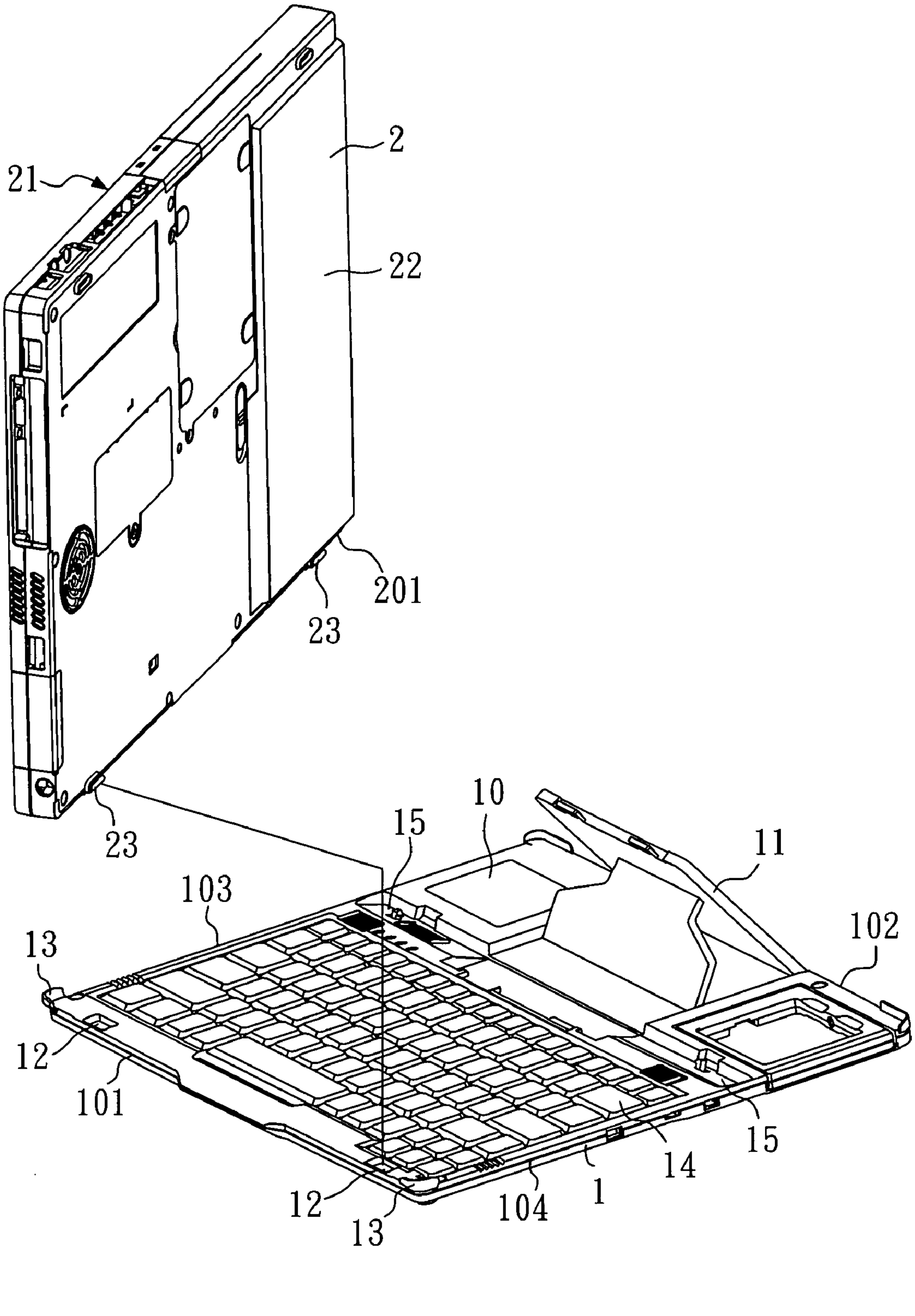
FIG. 2 is an exploded view of the preferred embodiment of the present invention.
Figure 3:
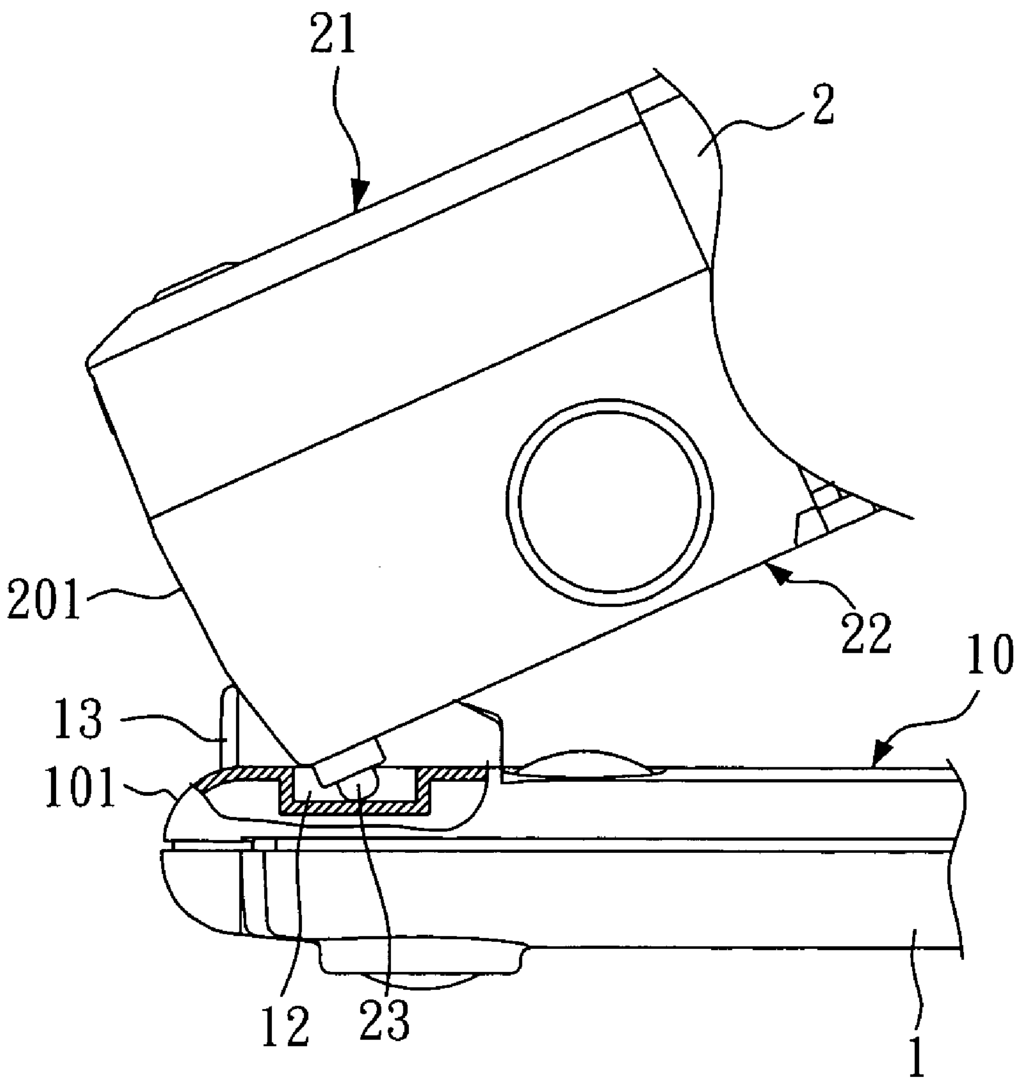
FIG. 3 is an enlarged view of a part of the present invention, showing the raised portions of the portable computer engaged into the recessed holes of the base member.
Figure 4:
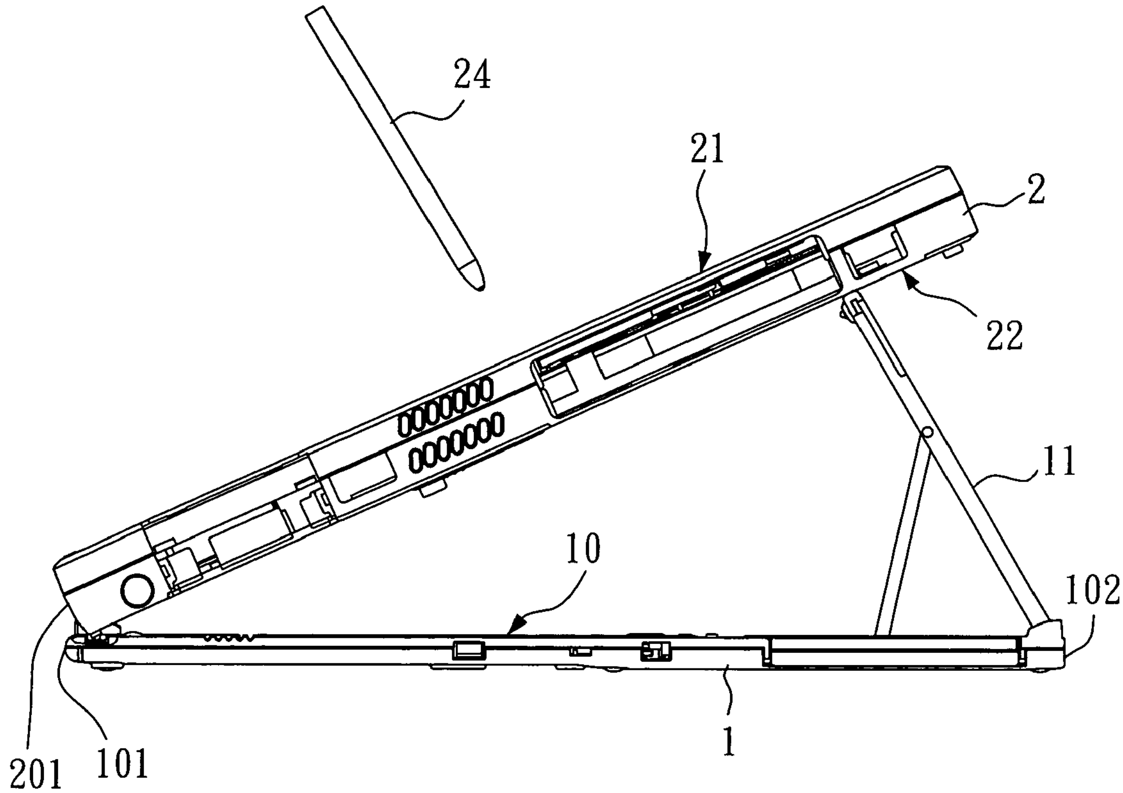
FIG. 4 is a schematic side view showing the portable computer supported on the base member in the position of low steepness.

Referring to FIGS. 3 and 4 and FIG. 2 again, the portable computer 2 can be put on the top face 10 of the base member 1 in an inclined position of high steepness with the display face 21 facing upwards, wherein the back face 22 of the portable computer 2 is supported on the support arm 11, and the two locating devices 23 of the portable computer 2 are respectively set into engagement with the two rear locating devices 15 of the base member 1, i.e., the raised portions 23 are respectively engaged into the rear recessed portions 15 of the base member 1. At this time, the user can use the keyboard 14 of the base member 1 for data input.

Alternatively, the portable computer 2 can be put on the top face 10 of the base member 1 in an inclined position of low steepness with the display face 21 facing upwards, wherein the back face 22 of the portable computer 2 is supported on the support arm 11, and the two locating devices 23 of the portable computer 2 are respectively set into engagement with the two front locating devices 12 of the base member 1, i.e., the raised portions 23 are respectively engaged into the front recessed portions 12 of the base member 1, and the bottom edge 201 of the portable computer 2 is stopped against at the stop flanges 13 of the base member 1. At this time, the user can use a touching pen 24 to input data, as shown in FIG. 4.

As indicated above, by means of the front locating devices 12 and rear locating devices 15 of the base member 1, the portable computer 2 can be supported on the base member 1 between two tilted positions, i.e., the user can use the keyboard 14 for data input when positioned the portable computer 2 on the rear locating devices 15, or use the touching pen 24 to input data when positioned the portable computer 2 on the front locating devices 12. Therefore, the aforesaid design of the present invention greatly improves the convenience of use of the portable computer 2. When using the touching pen 24 to operate the portable computer 2, the portable computer 2 is supported in a smoothly inclined position. This ergonomic design enables the user to operate the portable computer 2 with the hand comfortably without causing injury to the user's hand. Further, the design of the stop flanges 13 ensures positive positioning of the portable computer 2.

The aforesaid front locating devices 12 and rear locating devices 15 are not limited to the design of recessed portions. Snap, hook and eye means, or other similar designs may be employed as a substitute.

Although the present invention has been explained in relation to its preferred embodiment, it is to be understood that many other possible modifications and variations can be made without departing from the spirit and scope of the invention as hereinafter claimed.

What is claimed is:

1. A portable computer standing support structure comprising:

a base member, said base member comprising a top face, a front edge, a rear edge, a left-side edge, a right-side edge, a support arm fastened pivotally on said top face near said rear edge and rotatableupwardly relative to said top face, at least one front locating device formed on said top face near said front edge, and at least one rear locating device formed on said top face between said front edge and said rear edge; and a portable computer, said portable computer comprising a bottom edge, a front display face, a back face, and at least one locating device protruded from said back face adjacent to said bottom edge and adapted to selectively engage into the at least one front locating device and at least one rear locating device of said base member;

wherein said portable computer can be alternatively supported on said support arm of said base member between a first inclined position where the back face of said portable computer is supported on the support arm of said base member and the at least one locating device of said portable computer is respectively set into engagement with the at least one rear locating device, and a second inclined position where the back face of said portable computer is supported on the support arm of said base member and the at least one locating device of said portable computer is respectively set into engagement with the at least one front locating device for enabling said portable computer to be operated with a touching pen.

2. The portable computer standing support structure as claimed in claim 1, wherein said base member further comprises two stop flanges respectively upwardly protruded from said top face adjacent to two distal ends of said front edge and adapted to stop against the bottom edge of said portable computer in said second inclined position.

3. The portable computer standing support structure as claimed in claim 1, wherein said base member further comprises a keyboard mounted on said top face.

4. The portable computer standing support structure as claimed in claim 1, wherein said portable computer is a tablet PC.

* * * * *